United States Patent
Shin et al.

(10) Patent No.: US 10,327,314 B1
(45) Date of Patent: Jun. 18, 2019

(54) SYSTEM FOR INTEGRATED REMOTE CONTROL OF WIRELESS LIGHTING DEVICE AND WIRELESS ELECTRIC AND ELECTRONIC DEVICES IN WIRELESS NETWORK ENVIRONMENT

(71) Applicant: Merlot Laboratories Inc., Seoul (KR)

(72) Inventors: So-Bong Shin, Daejeon (KR); Won-Jae Choi, Seongnam-si (KR); Yong-Chul Song, Seoul (KR); Sang-Yeol Park, Seoul (KR)

(73) Assignee: MERLOT LABORATORIES INC., Seoul (KR)

( * ) Notice: Subject to any disclaimer, the term of this patent is extended or adjusted under 35 U.S.C. 154(b) by 0 days.

(21) Appl. No.: 16/016,856

(22) Filed: Jun. 25, 2018

(30) Foreign Application Priority Data

Feb. 12, 2018 (KR) ........................ 10-2018-0016835

(51) Int. Cl.
| | |
|---|---|
| *H04W 4/80* | (2018.01) |
| *H05B 37/02* | (2006.01) |
| *H04W 84/12* | (2009.01) |
| *H04W 84/18* | (2009.01) |
| *H04W 84/04* | (2009.01) |
| *H04L 12/44* | (2006.01) |

(52) U.S. Cl.
CPC .......... *H05B 37/0272* (2013.01); *H04W 4/80* (2018.02); *H04L 12/44* (2013.01); *H04W 84/045* (2013.01); *H04W 84/12* (2013.01); *H04W 84/18* (2013.01)

(58) Field of Classification Search
CPC ............................ H05B 37/0272; H04W 4/80
USPC .................................. 315/291, 294, 224, 307
See application file for complete search history.

(56) References Cited

U.S. PATENT DOCUMENTS

| | | | | |
|---|---|---|---|---|
| 8,989,053 | B1* | 3/2015 | Skaaksrud | H04W 12/06 370/255 |
| 2013/0134891 | A1* | 5/2013 | Woytowitz | H05B 37/02 315/201 |
| 2013/0204943 | A1* | 8/2013 | Ricci | G06F 3/0484 709/204 |
| 2014/0084795 | A1* | 3/2014 | Cumpston | H05B 37/0272 315/149 |
| 2014/0097937 | A1* | 4/2014 | Gercekci | G08C 17/02 340/5.61 |

(Continued)

FOREIGN PATENT DOCUMENTS

| | | |
|---|---|---|
| KR | 100730238 B1 | 6/2007 |
| KR | 101283370 B1 | 7/2013 |

*Primary Examiner* — Douglas W Owens
*Assistant Examiner* — Syed M Kaiser
(74) *Attorney, Agent, or Firm* — Lucas & Mercanti, LLP

(57) ABSTRACT

Disclosed is a system for integrated remote control of wireless lighting devices and wireless electric/electronic devices in a wireless network environment. In the wireless network environment, a management server transmits a lighting control command and a device control command for individually driving and controlling wireless lighting devices and wireless electric/electronic devices to the wireless lighting devices on a main wireless node (i.e., first wireless node) over a communication network. Therefore, a user can wirelessly and remotely drive and control various wireless electric/electronic devices as well as wireless lighting devices through the management server without time and place constrains.

29 Claims, 3 Drawing Sheets

(56) References Cited

U.S. PATENT DOCUMENTS

| | | | |
|---|---|---|---|
| 2015/0237700 A1* | 8/2015 | Woytowitz | H05B 33/0863 |
| | | | 315/307 |
| 2016/0029190 A1* | 1/2016 | Rattner | H04W 76/10 |
| | | | 455/414.4 |
| 2016/0088708 A1* | 3/2016 | Anthony | H05B 37/029 |
| | | | 315/294 |
| 2018/0235060 A1* | 8/2018 | Vendetti | H05B 37/0272 |

* cited by examiner

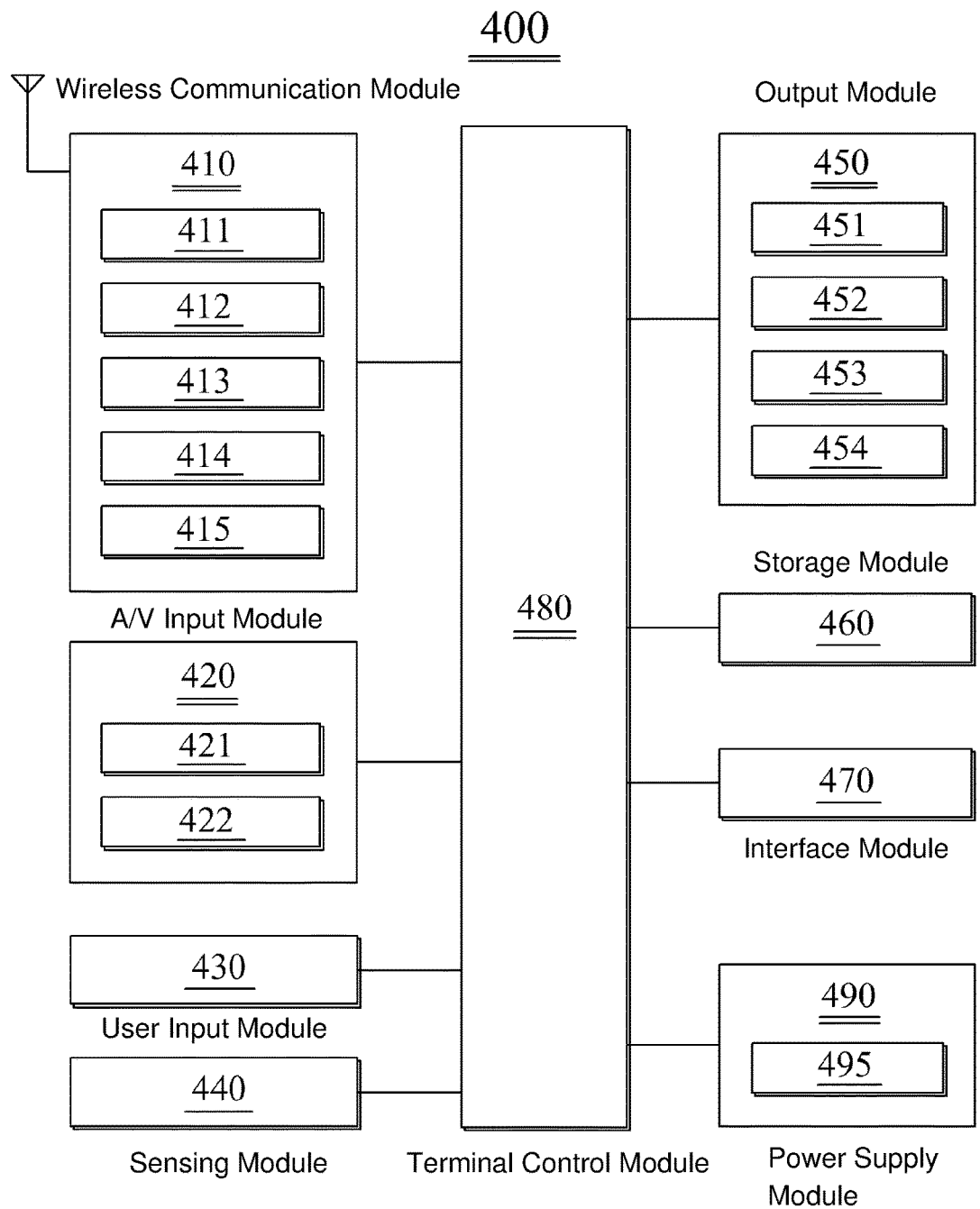

SYSTEM FOR INTEGRATED REMOTE CONTROL OF WIRELESS LIGHTING DEVICE AND WIRELESS ELECTRIC AND ELECTRONIC DEVICES IN WIRELESS NETWORK ENVIRONMENT

CROSS-REFERENCE TO RELATED APPLICATION

This application claims the benefit of Korean Patent Application No. 10-2018-0016835, filed Feb. 12, 2018, the contents of each of which are incorporated herein by reference.

TECHNICAL FIELD

The present invention relates to a system for integrated remote control of a wireless lighting device and a wireless electric and electronic device in a wireless network-based environment.

RELATED ART

Generally, lighting devices are installed in homes, offices, factories, and various other places, and lighting switches are also installed to switch on and off the lighting devices. A lighting switch is usually connected directly to one strand of the power line and indirectly to the other strand via a lighting device to allow and stop of supply of power to the lighting device.

That is, a conventional switch connection method will be briefly described. In the case of two light switches existing, one end of each of the light switches is directly connected to one power line strand connected to the AC power supply, and the other end of each of the light switches is indirectly connected to a corresponding power line strand of the other two power line strands connected to the AC power supply via a corresponding lighting device of the lighting devices.

Such a conventional lighting switch connection structure is connected to a power line extending from a wall, so that its installation is limited, and its installation position is difficult to move. Therefore, this has caused much inconvenience to a user in the operation of controlling lighting devices.

In order to solve such a problem, a "Remote Control Type Lighting Switch Module" is disclosed in Korean Patent No. 10-1283370. The module includes: a main body to be attached to a mounting surface; a mood lighting unit having a light emitting device (LED) as a mood lighting and provided on an outer surface of the main body to provide the mood lighting; a first lighting switch provided on an outer surface of the main body to turn on and off a lighting device; a main controller that receives a signal in response to switching on and switching off of the first lighting switch such that the mood lighting is turned on and off in reverse to the switching-on and switching-off of the first switch, outputs a control signal controlling the lighting device to be turned on and off to correspondingly response to the switching-on and switching-off of the first lighting switch, and a control signal transmission unit provided in the main body such that the lighting device receives a radio control signal output from the main controller so as to be controlled by the radio control signal.

However, since the related art requires the use of a remote control, the related art has problems that it is necessary to always keep a remote control in a place where it can be easily found, it is troublesome to purchase a new remote control in the case of missing the remote control, a lighting device can be operated or controlled only within in a limited range (i.e., short distance) from the installation position of a lighting switch on a wall, which suppresses practical use and spread of the related art because there is no expandability.

In households, dedicated wireless remote controls are used to operate and control various electric and electronic devices such as a TV, an air conditioner, a fan, etc. Therefore, there are problems in that it is necessary to always keep each exclusive dedicated remote control for a corresponding device in a place where it can be easily found, and it is troublesome to purchase a new dedicated remote control to replace a missing remote control, and it is not possible to operate and control various electric and electronic devices at a long distance.

On the other hand, in recent years, wireless networks such as wireless home control networks have become increasingly popular, and systems capable of integrally remotely driving and controlling various wireless electronic devices including wireless lighting devices in such a wireless network environment.

Document of Related Art

Patent Document (Patent Document 1) Korean Patent No. 10-1283370
(Patent Document 2) Korean Patent No. 10-0730238

SUMMARY OF THE INVENTION

Accordingly, the present invention has made in view of the problems occurring in the related art, and one objective of the present invention is to provide a system for integrated remote control of wireless lighting devices and wireless electric/electronic devices in a wireless network environment in such a manner that a management server transmits a lighting control command for controlling wireless lighting devices and a device control command for controlling electric/electronic devices to a main wireless node through a communication network in the wireless network environment, so that a user can perform wireless control on the wireless lighting devices and perform radio communication with the wireless electric/electronic devices equipped with a wireless communication ability without time and place constraints.

Another objective of the present invention is to provide a system for integrated remote control of wireless lighting devices and wireless electric/electronic devices in a wireless network environment in which different types of wireless node are connected to a wireless network, the system enabling different types of resource to communicate information with each other while maintaining the configuration of an existing wireless network even though a further different type of wireless node is added to the existing wireless network, thereby reducing installation cost for addition of wireless network devices and enabling efficient management of information.

In order to accomplish the objectives of the invention, one aspect of the invention provides a system for integrated remote control of wireless lighting devices and wireless electric/electronic devices in a wireless network environment, the system including: a management server configured to simultaneously transmit a lighting control command and a device control command; one or more first wireless nodes connected to the management server through a communication network, each first node being configured to receive and analyze the lighting control command and the device control command transmitted from the management server, to generate a lighting control signal and a device control signal that are separate and independent signals for individually driving and controlling at least one wireless lighting device and at least one electric/electronic device, thereby individually driving and controlling each of the wireless lighting devices, and to wirelessly transmit the device control signal for each of the wireless electric/electronic devices; one or more second wireless nodes constructing a wireless network by wirelessly connecting to the one or more first wireless node, performing data processing so as to communicate data with the one or more first wireless nodes, and including one or more wireless communication devices connected to each other in a short-range wireless communication manner; and the at least one wireless electric/electronic device configured to wirelessly receive the device control signal wirelessly transmitted from the first wireless node so as to be driven and controlled based on the received device control signal.

Preferably, the first wireless node may include a first hub device having unique node identification information and performing data processing to enable data communication between heterogeneous wireless nodes.

Preferably, the second wireless node may include a second hub device having unique node identification information and performing data processing to enable data communication with the first wireless nodes, and one or more wireless communication devices connected to each other in a short-range communication manner.

Preferably, the management server may be connected to the first hub device of the first wireless node through the communication network and may be configured to receive information of each of the wireless communication devices connected to the second hub device of the second wireless node via the first hub device of the first wireless node and to store and manage the received information in a database form for each of the wireless communication devices.

Preferably, the management server may generate an information collection command for acquiring information of each of the wireless communication devices connected to the second wireless node, and transmit the generated information collection command for the each of the wireless communication devices to the first hub device of the first wireless node through the communication network by using the unique node identification information of the first hub device.

Preferably, the first hub device of the first wireless node may receive the information collection command transmitted from the management server for each of the wireless communication devices, convert the information collection into a predefined heterogeneous wireless node communication protocol format, and wirelessly transmit the resulting information collection command in the heterogeneous wireless node communication protocol format, to the second hub device of the second wireless node by using the unique node identification information of the second hub device.

Preferably, the second hub device of the second wireless node may receive the transmitted information collection command in the heterogeneous wireless node communication protocol format, from the first hub device of the first wireless node, convert the received the information collection command into a predefined short-range wireless communication protocol format, and transmit the resulting information collection command in the short-range wireless communication protocol format, for each of the wireless communication devices, to a corresponding one of the wireless communication devices.

Each of the wireless communication devices connected to the second hub device of the second wireless node may perform receiving the information collection command transmitted from the second hub device of the second wireless node, collecting information data thereof, based on the information collection command, converting the collected information data thereof into a predefined short-range wireless communication protocol format, and transmitting the information data in the short-range wireless communication protocol format to the second hub device of the second wireless node.

Preferably, the second hub device of the second wireless node may perform receiving information data of each of the wireless communication devices collected by and transmitted from each of the wireless communication devices, converting the information data into a predefined heterogeneous wireless node communication protocol format, and wirelessly transmitting the information data of each of the wireless communication devices in the heterogeneous wireless node communication protocol format to the first hub device of the first wireless node by using the unique node identification information of the first hub device.

Preferably, the first hub device of the first wireless node may receive the information data of each of the wireless communication devices, which is wirelessly transmitted from the second hub device of the second wireless node, converts the received information data into a predefined communication protocol format, and transmit the resulting information data in the predefined communication protocol format to the management server through the communication network.

Preferably, the management server may generate a control command for controlling each of the wireless communication devices connected the second wireless node, and transmit the control command for each of the wireless communication devices to the first hub device of the first wireless node through the communication network by using the unique node identification information of the first hub device.

Preferably, the first hub device of the first wireless node may receive the control command for controlling each of the wireless communication devices, which is transmitted from the management server, convert the control command into a predefined heterogeneous wireless node communication protocol format, wirelessly transmit the resulting control command for controlling each of the wireless communication devices, which is in the heterogeneous wireless node communication protocol format, to the second hub device of the second wireless node by using the unique node identification of the second hub device.

Preferably, the second hub device of the second wireless node may receive the control command for each of the wireless communication devices, which is in the heterogeneous wireless node communication protocol format and is wirelessly transmitted, from the first hub device of the first wireless node, convert the control command into a predefined short-range wireless communication protocol format, and transmit the resulting control command for each of the wireless communication devices, which is in the short-range wireless communication protocol format, to a corresponding one of the wireless communication devices.

Preferably, each of the wireless communication devices connected to the second hub device of the second wireless node may receive the control command for a corresponding one of the wireless communication devices transmitted from the second hub device of the second wireless node, perform control on the corresponding one of the wireless communication devices, based on the received control command, generates a control completion message thereof, convert the control completion message into a predefined short-range wireless communication protocol format, and transmit the resulting control completion message in the predefined short-range wireless communication protocol format to the second hub device of the second wireless node.

Preferably, the second hub device of the second wireless node may receive the control completion message generated by and transmitted from each of the wireless communication devices, convert the control completion message into a predefined heterogeneous wireless node communication protocol format, and wirelessly transmit the control completion message for each of the wireless communication devices in the heterogeneous wireless node communication protocol format to the first hub device of the first wireless node by using the unique node identification information of the first hub device.

Preferably, the first hub device of the first wireless node may receive the control completion message of each of the wireless communication devices, which is wirelessly transmitted from the second hub device of the second wireless node, convert the control completion message into a predefined communication protocol format, and transmit the resulting control completion message in the communication protocol format to the management server through the communication network.

Preferably, the system may further include one or more third wireless nodes, each third wireless node comprising a third hub device having unique identification information and performing data processing to enable data exchange between heterogeneous wireless nodes and one or more wireless communication devices connected to each other in a short-range wireless communication manner.

Preferably, the management server may generate control commands for controlling the respective wireless communication devices connected to the third wireless node, and transmit the control commands for controlling the respective wireless communication devices connected to the third wireless node, to the first hub device of the first wireless node by using the unique node identification information of the first hub device.

Preferably, the first hub device of the first wireless node receives the control commands for controlling the respective wireless communication devices transmitted from the management server, converts the control commands into a predefined heterogeneous wireless node communication protocol format, and wirelessly transmits the resulting control commands for the respective wireless communication devices to the third hub device of the third wireless node by using the unique node identification information of the third hub device.

Preferably, the third hub device of the third wireless nodes receives the control commands for the respective wireless communication devices, which are in the heterogeneous wireless node communication protocol format and are transmitted from the first hub device of the first wireless node, converts the resulting control commands into a predefined short-range wireless communication protocol format, and transmits the control commands for the respective wireless communication devices, which are in the short-range wireless communication protocol format, to the corresponding wireless communication devices.

Preferably, each of the wireless communication devices connected to the third hub device of the third wireless nodes receives the control command for a corresponding one of the wireless communication devices from the third hub device of the third wireless node, performs control based on the received control command, generates a control completion message thereof based on the received control command, converts the control completion message into a predefined short-range wireless communication protocol format, and transmits the resulting control completion message in the short-range wireless communication protocol format to the third hub device of the third wireless nodes, Preferably, the third hub device of the third wireless nodes receives the control completion message generated by and transmitted from each of the wireless communication devices, converts the control completion message for each of the wireless communication devices into a predefined heterogeneous wireless node communication protocol format, and wirelessly transmits the resulting control completion message in the heterogeneous wireless node communication protocol format of each of the wireless communication devices to the first hub device of the first wireless node by using the unique node identification information of the first hub device, Preferably, wherein the first hub device of the first wireless node receives the control completion message of each of the wireless communication devices, which is wirelessly transmitted from the third hub device of the third wireless node, converts the control completion message into a predefined communication protocol format, and transmits the control completion message to the management server through the communication network.

Preferably, the management server generates an information collection command for acquiring information of each of the wireless communication devices connected to the third wireless node, and transmits the generated information collection command for each of the wireless communication devices to the first hub device of the first wireless node through the communication network by using the unique identification information of the first hub device.

Preferably, the first hub device of the first wireless node receives the information collection command for each of the wireless communication devices transmitted from the management server, converts the received information collection commands into a predefined heterogeneous wireless node communication protocol format, and wirelessly transmits the resulting information collection commands for the wireless communication devices, which are in the heterogeneous wireless node communication protocol format, to the third hub device of the third wireless nodes by using the unique node identification information of the third hub device, Preferably, the third hub device of the third wireless nodes receives the information collection command for each of the wireless communication devices, which is in the heterogeneous wireless node communication protocol format and is wirelessly transmitted from the first hub device of the first wireless node, converts the received information collection commands into a predefined short-range wireless communication protocol format, and transmits the resulting information collection commands in the short-range wireless communication protocol format for each of the wireless communication devices, to a corresponding one of the wireless communication devices.

Preferably, each of the wireless communication devices connected to the third hub device of the third wireless, receives information collection command for a corresponding one of the wireless communication devices from the third hub device of the third wireless node, collects information data thereof when the wireless communication device itself corresponds to the received information collection command, based on the received information collection commands for each of the wireless communication devices, converts the collected information data of each of the wireless communication devices into a predefined short-range wireless communication protocol format, and transmits the collected information in the short-range wireless communication protocol format to the third hub device of the third wireless nodes, Preferably, the third hub device of the third wireless nodes receives the information data of each of the wireless communication devices collected by and transmitted from each of the wireless communication devices, converts the received information data into a heterogeneous wireless node communication protocol format, and wirelessly transmits the information data of each of the wireless communication devices, which is in the heterogeneous wireless node communication protocol format, to the first hub device of the first wireless node by using the unique identification information of the first hub device.

Preferably, the first hub device of the first wireless node receives the information data of each of the wireless communication devices wirelessly transmitted from the third hub device of the third wireless node, converts the information data into a predefined communication protocol, and transmits the information data resulting from the conversion, to the management server through the communication network.

Preferably, the first hub device of the first wireless node includes a first node processor having unique node identification information and performing data processing to enable data communication between heterogeneous wireless nodes.

Preferably, the second hub device of the second wireless node includes a second node processor wirelessly connected to the first node processor of the first wireless node for data communication and having unique node identification information, and a device connection processor connected to the second node processor in a wired or wireless manner and performing wireless connection between the wireless communication devices in a short-range wireless communication manner.

Preferably, the second node processor and the device connection processor communicate with each other using a standard on-board peripheral interface.

Preferably, a communication protocol for communication between the first hub device of the first wireless node and the management server is implemented by a wireless Internet protocol (IP) via at least one wireless access point (AP) or a gateway.

Preferably, the communication network is a wireless communication network selected from among WiFi for provision of high-speed multimedia transmission service, WiGig, wireless broadband internet (Wibro), and world interoperability for microwave access (Wimax), or is a cellular-based wideband code division multiple access (WCDMA), or is a mobile communication network selected among a 3G network, an LTE network, a 4G network, and a 5G network.

Preferably, the short-range wireless communication is performed by a short-range wireless communication selected from among Bluetooth, ZigBee, Beacon, radio frequency identification (RFID), ultra wideband (UWB), and infrared radiation (IR) communication.

Preferably, the wireless network is configured with a wireless mesh network (WMN).

Preferably, the unique node identification information comprises unique node identification that is preliminarily allocated.

Preferably, each of the wireless communication devices connected to the second hub device of the second wireless node comprises an Internet of Things (IoT) sensor.

Preferably, the IoT sensor includes at least any one sensor selected from among a stereoscopic image sensor, an infrared thermal image sensor, a temperature sensor, a humidity sensor, a dust sensor, a smoke sensor, a illuminance sensor, a carbon monoxide sensor, a carbon dioxide sensor, an ozone sensor, a ultrasonic sensor, a motion sensor, a lighting sensor, a household appliance, a door lock, and an illuminance sensor.

Preferably, each of the wireless lighting devices of the first wireless node may include: an LED lighting module for emitting light to the outside using at least one light emitting diode (LED) lighting device; an IR generating module for emitting an infrared radiation (IR) signal to the outside using at least one infrared radiation (IR) emitting device; an LED driving module for driving each of the light emitting diode (LED) lighting devices of the LED lighting module; an IR driving module for driving each of the infrared radiation (IR) emitting devices of the IR generating module; a communication module for wirelessly receiving the device control command and the lighting control command transmitted from the management server; and a control module for receiving and analyzing the lighting control command and the device control command wirelessly transmitted from the communication module and separately generating and outputting the lighting control signal and the device control signal for independently and individually driving and controlling each of the wireless lighting devices and each of the wireless electric/electronic devices, based on the received lighting control command and the device control command.

Preferably, the LED driving module may include: a pulse width modulation (PWM) generator for generating a pulse width modulation (PWM) signal corresponding to the lighting control command transmitted from the management server under the control of the control module; and an LED driver for applying a direct current (DC) or alternating current (AC) driving power so that a corresponding one of the LED lighting devices is turned on and off and a brightness of the corresponding one of the LED lighting devices is adjusted according to the pulse width modulation (PWM) signal generated by the PWM generator.

Preferably, the IR driving module may include: an IR modulator for modulating the device control command transmitted from the management server into an IR modulated signal according to the control of the control module; and an IR driver for applying a driving power according to the IR modulated signal output from the IR modulator such that a corresponding one of the IR light emitting devices is turned on and off according to the IR modulated signal.

Preferably, the IR modulator may convert the device control command into the IR modulated signal having an infrared radiation (IR) code of a specific pattern in accordance with an existing communication channel standard.

Preferably, the management server may transmit the unique device identification information of the corresponding wireless lighting device when transmitting the lighting control command.

Preferably, the unique identification information of the wireless lighting device may include at least one of a name, password, serial number, type, manufacturer, media access control (MAC) address, unique Internet protocol (IP) address, model, and version of the wireless lighting device, and authentication information of the wireless lighting device generated by using a secrete key of the wireless lighting device or a PKI-based private key.

Preferably, the management server may transmit the unique device identification information of the corresponding wireless electric/electronic device when transmitting the lighting control command.

Preferably, the unique device identification information of the wireless electric/electronic device may include at least any one of a name, password, serial number, type, manufacturer, MAC address, IP address, model, and version of the wireless electric/electronic device, and authentication information of the wireless electric/electronic device generated by using a private key of the wireless electric/electronic device or a PKI-based private key.

Preferably, the system may further include a wireless terminal configured to wirelessly transmit the lighting control command and the device control command to the management server.

Preferably, the wireless terminal may include at least any one selected from among a smart phone, a smart pad, a smart note, and an artificial intelligence (AI)-based wireless communication device.

Preferably, when the wireless terminal is any one mobile communication terminal selected from among the smart phone, the smart pad, and the smart note, the lighting control command and the device control command are wirelessly transmitted by a lighting and device control application pre-installed in the mobile communication terminal.

Preferably, when the lighting control command and the device control command are transmitted through the wireless terminal, unique terminal identification information of the wireless terminal is transmitted along with the lighting control command and the device control command.

Preferably, the management server compares the unique terminal identification information transmitted through the wireless terminal and unique terminal identification information that is preset, when both pieces of the unique terminal identification information match, the management server transmits the lighting control command and the device control command to the first wireless node.

Preferably, the unique terminal identification information of the wireless terminal includes at least any one of a name, password, serial number, type, manufacturer, media access control (MAC) address, unique Internet protocol (IP) address, model, and version of the wireless terminal, and authentication information of the wireless terminal generated by using a private key of the wireless terminal or a PKI-based private key.

Preferably, the terminal identification information preset in the management server is preliminarily set by the wireless terminal and stored in a separate database.

Preferably, the wireless terminal transmits a request message for requesting setting of the terminal identification information along with the unique device identification information of the corresponding wireless lighting device;

Preferably, the management server receives the unique device identification information of one of the wireless lighting devices transmitted from the wireless terminal and the request message for requesting setting of the terminal identification information, compares the unique device identification information of the wireless lighting device stored therein with the received unique device identification information, and transmits a synchronization signal to the wireless terminal when the received information and the stored information match.

Preferably, the wireless terminal receives the synchronization signal transmitted from the management server and synchronizes itself with the management server, and performs a information setting function by which the unique device identification of the wireless terminal is set and stored.

Preferably, the wireless electric/electronic device is at least one home appliance selected having a wireless communication ability, the home appliance being selected from among a TV, a computer, sound equipment, video equipment, an intercom, an air conditioner, an air purifier, an electric fan, a refrigerator, a washing machine, a rice cooker, a fan heater, a boiler, a microwave oven, and a vacuum cleaner.

The system for integrated remote control of wireless lighting devices and wireless electric/electronic devices in a wireless network environment, according to the present invention, has the configuration and the advantage described below. In a wireless network-based environment, the management server connected to the main wireless node in which the wireless lighting devices and the wireless electric/electronic devices are provided through a communication network transmits a lighting control command and a device control command for driving and controlling the wireless lighting devices and the wireless electric/electronic devices to the main wireless node, so that a user can communicate with and collectively remotely control the wireless lighting devices and the wireless electric/electronic devices via the management server, without time and place constraints.

In accordion, according to the present invention, in a wireless network environment in which heterogeneous wireless nodes are connected to each other through a wireless network, when a further different type of a wireless node is added to the wireless network, it is possible to enable exchange of information between the heterogeneous wireless nodes including the newly added node while maintaining the configuration of an existing wireless network, thereby reducing installation cost for addition of new heterogeneous nodes to the existing network and efficiently managing information.

BRIEF DESCRIPTION OF THE DRAWINGS

FIG. 3 is a block diagram illustrating a detailed configuration of a wireless terminal according to one embodiment of the present invention.

DETAILED DESCRIPTION OF THE INVENTION

Figure 1:
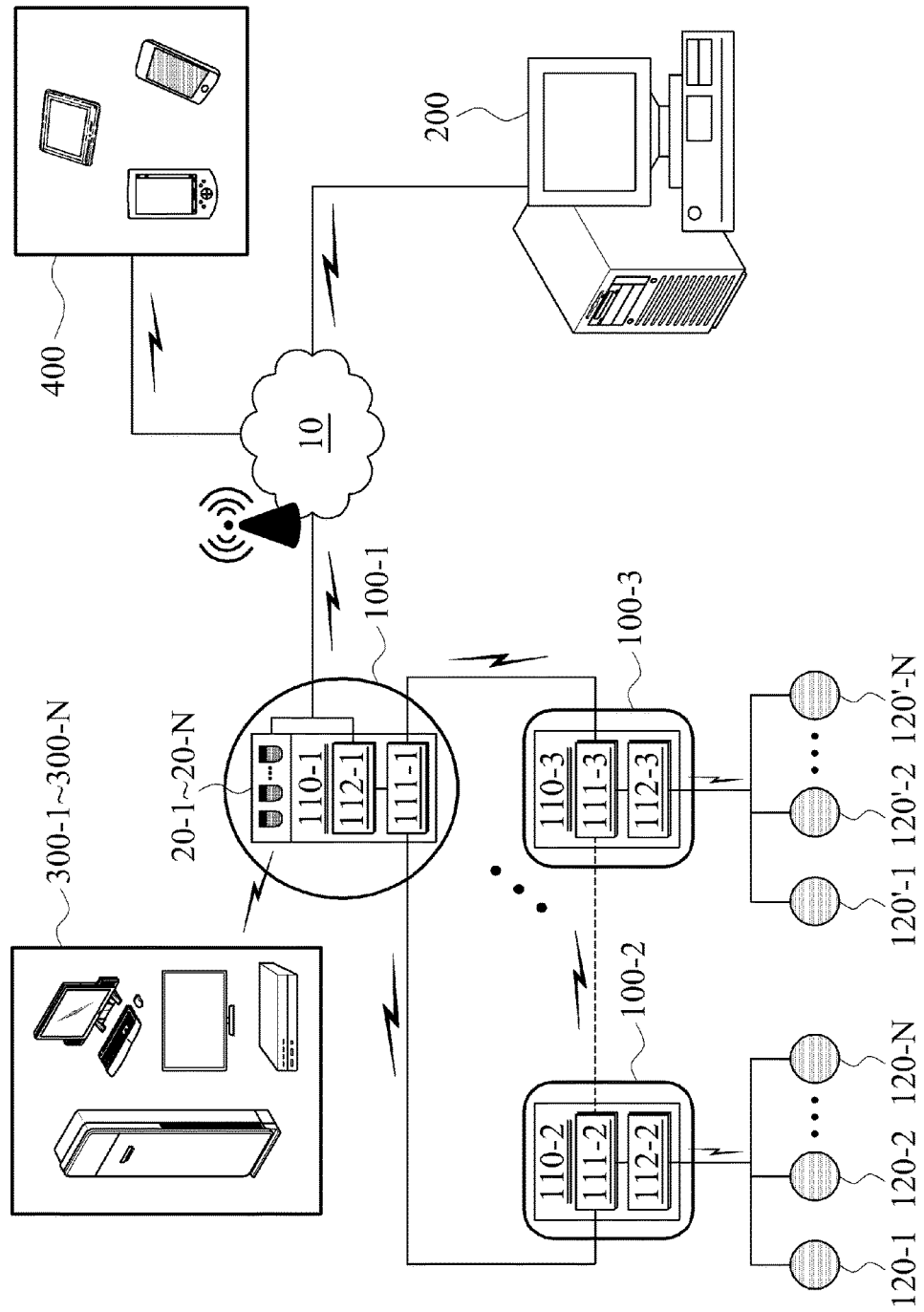
FIG. 1 is a block diagram illustrating the overall configuration of a system for integrated remote control of a wireless lighting device and a wireless electric/electronic device in a wireless network environment according to an exemplary embodiment of the present invention.

The above and other objects, features and advantages of the present invention will become more apparent by referring to a detailed description of exemplary embodiments with reference to the accompanied drawings, and accordingly those skilled in the art can easily implement the technical idea of the present invention. In the following description, well-known functions or constructions are not described in detail when there is likelihood that they would unnecessarily obscure the invention.

Terms "first", "second", etc. used in the specification can be used to discriminate one component from another component, but the order or priority of the components is not limited unless specifically stated. Accordingly, a first component in an embodiment may be referred to as a second component in another element, and similarly, a second component in an embodiment may be referred to as a first component in another embodiment within the scope of the present disclosure. The terminology used herein is for the purpose of describing particular embodiments only and is not intended to be limiting. As used herein, the singular forms "a", "an", and "the" are intended to include the plural forms as well, unless the context clearly indicates otherwise.

While the present invention has been described with terms that are presently considered to be the most practical and common in consideration of functions of components herein, it is to be understood that different terms may be used to refer to the same components according to the intentions of those skilled in the art and to emergence of case laws and new technologies. In addition, in certain cases, there may be terms arbitrarily selected by the inventor. In such a case, the meaning of the terms that are arbitrarily selected will be described in detail in the description of the corresponding components below. Therefore, the terms used in the present invention should be defined based not only on the ordinary meanings of the terms but on the entire contents of the present invention.

It will be further understood that when one component "comprises" or "has" another component, it means that the component may further include another component, not excluding other components unless stated otherwise. Also, the terms "~part", "~unit", "~module", and the like described herein may mean a component for processing at least one function or operation, which may be implemented by hardware or software or by a combination of hardware and software.

Hereinafter, embodiments of the present invention will be described in detail with reference to the accompanying drawings. However, the following embodiments of the present invention may be modified into various other forms, and the scope of the present invention is not limited to the following embodiments. The embodiments of the present invention are provided to enable those skilled in the art to more fully understand the present invention.

Combinations of each block of the accompanying block diagrams may be performed by computer program instructions (execution engines), and these computer program instructions may be embedded in a processor of a general purposes computer, special purpose computer, or other programmable data processing equipment. The instructions that are executed by the processor of the computer or other programmable data processing equipment may produce means for performing the functions described in each block of the block diagram. These computer program instructions may be stored in a computer or a computer-usable or computer-readable memory for a programmable data processing equipment to implement a function in a particular manner. Therefore, the instructions stored in the computer-usable or computer-readable memory are also capable of producing products that contain instruction means for performing the functions described in each block of the block diagram.

Since computer program instructions may be loaded onto a computer or other programmable data processing equipment, a series of operating steps may be performed on a computer or other programmable data processing equipment to create a computer-executable process which causes a computer or other programmable data processing equipment to perform steps for executing the functions described in the blocks of the block diagram.

Also, each block may represent a module, segment, or portion of code that includes one or more executable instructions for executing specified logical functions. In some alternate embodiments, the functions mentioned in the blocks may occur in a different order than that the blocks are described. For example, two blocks illustrated in succession may actually be executed substantially concurrently or may be performed in the reverse order of the function.

According to one embodiment, for convenience of description, a first wireless node 100-1 and a second wireless node 100-2 are wirelessly connected to each other to form a wireless network. However, the present invention is not limited to this, and a plurality of heterogeneous wireless nodes may be wirelessly connected to implement a wireless network.

Figure 2:
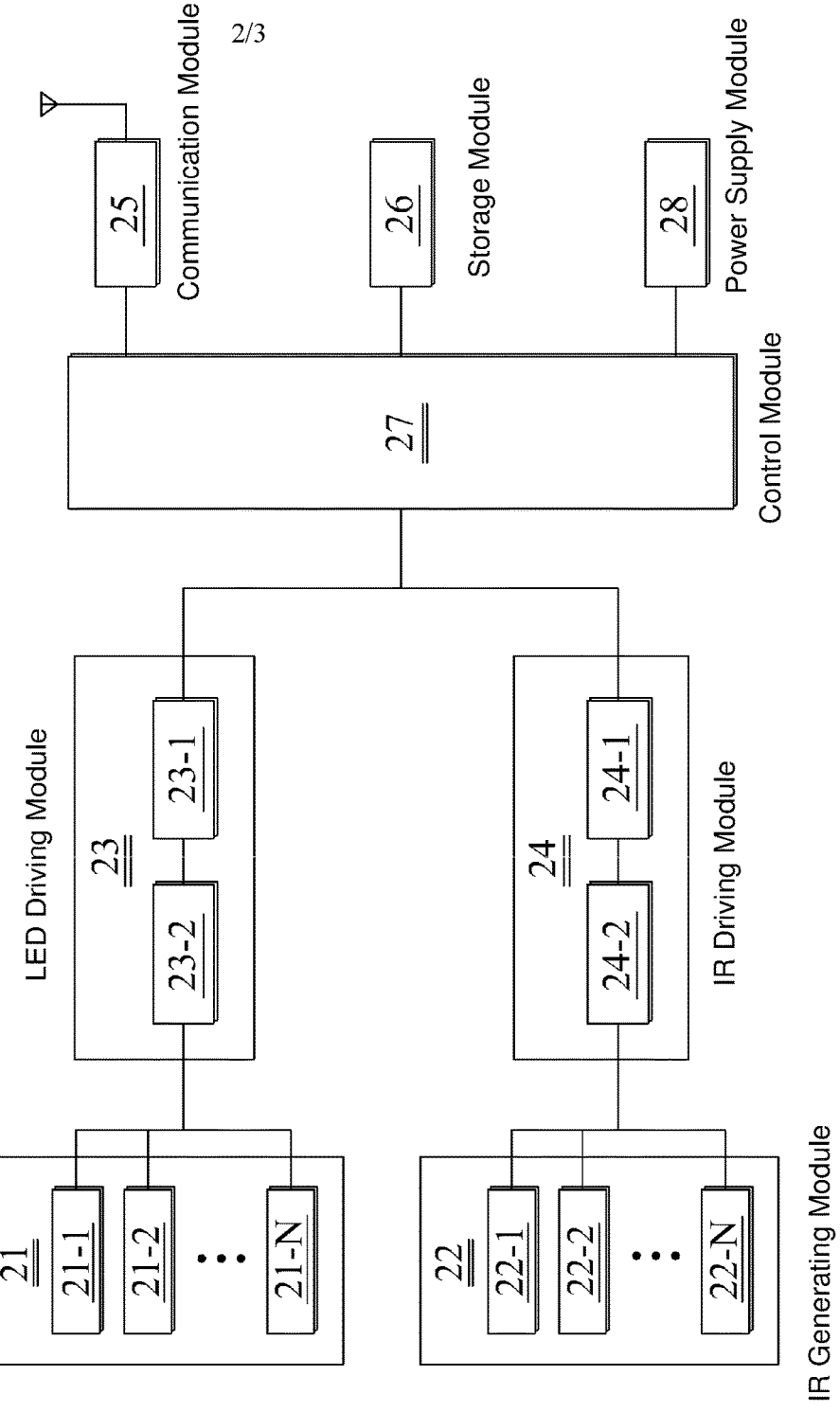
FIG. 2 is a block diagram illustrating a detailed configuration of the wireless lighting device according to one embodiment of the present invention.

FIG. 1 is a block diagram illustrating the overall configuration of a system for integrated remote control of wireless lighting devices and wireless electric/electronic devices in a wireless network environment according to one embodiment of the present invention. FIG. 2 is a block diagram illustrating a detailed configuration of wireless lighting devices according to one embodiment of the present invention. FIG. 3 is a block diagram illustrating a detailed configuration of wireless terminals according to one embodiment of the present invention.

Referring to FIGS. 1 to 3, the system for integrated remote control of wireless lighting devices and wireless electric/electronic devices in a wireless network environment according to the embodiment of the present invention includes the first wireless node 100-1, the second wireless node 100-2, a management server 200, and at least one wireless electrical/electronic device 300-1 to 300-N. In addition, the system for integrated remote control of wireless lighting devices and wireless electric/electronic devices in a wireless network environment according to the embodiment of the present invention may further include a third wireless node 100-3 and/or a wireless terminal 400. Constitutional components illustrated in FIG. 1 may not be essential elements. The system for integrated remote control of wireless lighting devices and wireless electric/electronic devices in a wireless network environment according to one embodiment of the present invention may further include more components or fewer components.

Hereinafter, the components of the system integrated remote control of wireless lighting devices and wireless electric/electronic devices in a wireless network environment according to one embodiment of the present invention will be described in detail.

The first wireless node 100-1 is connected to the management server 200 through a communication network 10. In this case, the communication network 10 is a communication network which is a high-speed infrastructural network capable for a large-scale communication network capable of large-capacity and long-distance voice and data services. It also may be an Internet or a next-generation wireless communication network for providing high-speed multimedia services, including WiFi, WiGig, Wireless Broadband Internet (Wibro), and World Interoperability for Microwave Access (Wimax).

The Internet is a global open computer network structure for providing the TCP/IP protocol and other upper-layer services such as hyper text transfer protocol (HTTP), Telnet, file transfer protocol (FTP), domain name system (DNS), simple mail transfer protocol (SMTP), simple network management protocol (SNTP), network file service (NFS), and network information service (NIS). The Internet provides an environment in which the first wireless node 100-1 can be connected to the management server 200. The Internet may be a wired or wireless Internet or may be a core network integrated with a wired public network, a wireless mobile communication network, or a portable Internet.

When the communication network 10 is a mobile communication network, it may be a synchronous mobile communication network or an asynchronous mobile communication network. As an example of the asynchronous mobile communication network, there is a communication network of a wideband code division multiple access (WCDMA) scheme. Although not illustrated in the drawings, the mobile communication network may include, for example, a radio network controller (RNC) or the like. Meanwhile, although the WCDMA network is described as an example of the mobile communication network, it may be a cellular based 3G network, a 4G network, a next generation communication network such as a 5G network, or one of IP networks based on IPs. The communication network 10 functions to enable exchange of signals and data between the first wireless node 100-1 and the management server 200.

The first wireless node 100-1 receives lighting control commands and device control commands transmitted from the management server 200, analyzes the received commands, and generates a lighting control signal and a device control signal that are separate and independent signals for driving and controlling at least one wireless lighting device 20-1 to 20-N independently of at least one wireless electric/electronic 300-1 to 300-N. Thus, it is possible to individually drive and control each of the wireless lighting devices and transmit the device control signal to each of the wireless electric/electronic devices 300-1 to 300-N in a wireless manner.

Here, each of the wireless lighting devices 20-1 to 20-N is a lighting device installed in a certain room or an outdoor space to illuminate the room or the outdoor space. As illustrated in FIG. 2, each of the wireless lighting devices 20-1 to 20-N includes an LED lighting module 21, an IR generating module 22, an LED driving module 23, an IR driving module 24, a communication module 25, a storage module 26, a control module 27, a power supply module 28, and the like. The components illustrated in FIG. 2 are not essential elements. That is, each of the wireless lighting device 20-1 to 20-N may include more or fewer components than those illustrated in FIG. 2.

Hereinafter, the components of each of the wireless lighting devices 20-1 to 20-N employed in the embodiment of the present invention will be described in detail below.

The LED lighting module 21 is configured to emit light of various colors, for example, red colors, green colors, blue colors, and white colors by using one or more light emitting diode (LED) lighting devices 21-1 to 21-N. The LED lighting module 21 is configured to generate light by being driven by a direct current (DC) or alternating (AC) driving power applied from an LED driving module 23.

The LED lighting module 21 preferably uses light emitting diode (LED) lighting devices 21-1 to 21-N, which are semiconductor devices that emit light to the outside. However, the LED lighting module 21 is not limited to this configuration. The LED lighting module 21 may include a module that emits light. That is, it may include at least one of a fluorescent lamp, an incandescent lamp, a halogen lamp, a mercury lamp, a neon lamp, a sodium lamp, a metal halide lamp, and an Electro-Luminescent (EL) lamp.

The IR generating module 22 performs the function of emitting an infrared radiation (IR) signal to the outside through one or more infrared radiation (IR) emitting devices 22-1 to 22-N. The LED driving module 23 is a module for driving each of the LED lighting devices 21-1 to 21-N of the LED lighting module 21. The LED driving module 23 performs the function of applying a DC or AC driving power to the LED lighting module 21 to adjust the amount and wavelength of light in accordance with a control command signal of a control module 27. The LED lighting module 21 can control the amount of light by adjusting an electric current, but the present invention may not be limited thereto.

The LED driving module 23 includes a PWM generator 23-1 for generating a pulse width modulation (PWM) signal corresponding to the lighting control command transmitted from the management server 200 in accordance with the control of the control module 27 and an LED driver 23-2 for applying a direct current (DC) or alternating current (AC) driving power so that the LED lighting devices 21-1 to 21-N are turned on and off or the illumination brightness of the LED lighting devices 21-1 to 21-N is adjusted according to the PWM signal generated by the PWM generator 23-1.

The IR driving module 24 is a module for driving the IR emitting devices 22-1 to 22-N of the IR generating module 22. The IR driving module 24 includes an IR modulator 24-1 generating an IR modulated signal corresponding to the device control command transmitted from the management server 200 in accordance with the control of the control module 27, and an IR driver 24-2 applies a driving power in accordance with the IR modulated signal generated by the IR modulator 24-1 such that a corresponding one of the IR emitting devices 22-1 to 22-N is turned on or off.

At this time, the IR modulator 24-1 converts the control command into an infrared radiation (IR) modulated signal having infrared radiation (IR) codes arranged in a specific pattern according to a predetermined communication channel standard. The IR modulated signal is a type of pulse wave modulation (PWM) signal. There are various standards for the IR modulated signal, and the pattern of 0s and 1s in succession varies according to the standards.

Although the exemplary embodiment of the present invention suggests the configuration in which the LED driver 23-2 of the LED driving module and the IR driver 24-2 of the IR driving module 24 are separated from each other, the present invention is not limited thereto. That is, a configuration in which only a single LED driver collectively drives the LED lighting devices 21-1 to 21-N and of the LED driving module 21 and the IR emitting devices 22-1 to 22-N of the IR generating module 22 may be employed.

The communication module 25 is a module for wirelessly receiving both of the device control command and the lighting control command transmitted from the management server 200. The communication module 25 can wirelessly communicate with the management server 200. The communication module 25 includes a wireless transmitter for frequency-up conversion and level-booting of a transmission signal and and a wireless receiver for low noise amplification and down-frequency conversion of a received signal.

It is preferable that the communication module 25 constructs a wireless mesh network (WMN) using a predetermined low power wireless communication (WPAN) scheme so as to perform wireless communication, but the present invention is not limited thereto. For example, a wireless Internet communication scheme such as wireless LAN (WLAN) Wi-Fi, wireless broadband (Wibro), world interoperability for microwave access (WIMAX), high speed downlink packet access (HSDPA), or WiFi. Alternatively, a short-range wireless communication scheme such as Beacon, ZigBee, Bluetooth, ultra wideband (UWB), radio frequency identification (RFID), or infrared radiation (IR) communication may be used to construct a wireless network.

The storage module 26 may include a program memory and a data memory. In the program memory, programs that control the general operation of each of the wireless lighting devices 20-1 through 20-N may be stored. Further stored in the program memory may include a program for enabling connection to a wireless mesh network configured with the management server 200 and/or each of the wireless lighting devices 20-1 to 20-N.

Stored in the program memory may include a program for driving the LED lighting module 21 and the IR generating module 22 under the control of the management server 200 and/or each of the wireless lighting devices 20-1 to 20-N. The data memory stores data generated during the execution of programs in the respective wireless lighting devices 20-1 to 20-N. The data memory may store, for example, device information, channel information, frequency information, or network group information.

Stored in the data memory of the storage module 26 may include unique device identification information of each of the wireless lighting devices 20-1 to 20-N and unique device identification information of each of the wireless electric/electronic devices 300-1 to 300-N.

That is, the storage module 26 may retain and maintain at least one program code executed by the control module 27 and at least one data set that the program code uses.

The storage module 26 may be a readable storage medium selected from among a flash memory type memory, a hard disk type memory, a multimedia card micro type memory, a card type memory (for example, an SD or XD memory), a random access memory (RAM), a static random access memory (SRAM), a read only memory (ROM), an electrically erasable programmable read-only memory (EEPROM), a programmable read-only memory (PROM), a magnetic memory, a magnetic disk, and an optical disk.

The control module 27 is a module for controlling the overall operation of each of the wireless lighting devices 20-1 to 20-N and performs various functions for each of the wireless lighting devices 20-1 to 20-N. The control module 27 may execute or process various software programs or a set of instructions stored in the storage module 26 to process data. That is, the control module 27 can process various signals based on the information stored in the storage module 26.

Also, the control module 27 can receive various signals from the communication module 25. That is, the control module 27 can perform various calculations based on various signals received from the communication module 25.

That is, the control module 27 receives the device control command and the lighting control command transmitted through the communication module 25 and analyzes the received device control command and the lighting control command to separately and independently drive the LED driving module 23 and the IR driving module 24. To separately drive and control the LED driving module 23 and the IR driving module 24, the control module generates a lighting control signal and a device control signal so that the LED lighting module 21 and the wireless electric/electronic devices 300-1 to 300-N can be individually controlled.

The power supply module 28 functions to supply power to all of the modules: the LED lighting module 21, the IR generating module 22, the LED driving module 23, the IR driving module 24, the communication module 25, the storage module 26, and the control module 27. The power supply module 28 is preferably configured to convert the rated AC power (for example, AC 220 V) to DC or AC power for continuous power supply, but the present invention is not limited thereto. It may be implemented as a conventional portable battery.

Meanwhile, the first wireless node 100-1 may include a first hub device 110-1 having unique node identification information to perform data processing so as to enable data exchange between heterogeneous wireless nodes.

The first hub device 110-1 of the first wireless node 100-1 includes a first node processor 111-1 having unique node identification information for performing data processing to enable data exchange between different wireless nodes, and a communication connection processor 112-1 which is connected to the first node processor 111-1 in a wired or wireless communicable manner. The communication connection processor 112-1 is also connected to the management server 200 through the communication network 10 in a wired or wireless communicable manner.

At this time, the first node processor 111-1 and the communication connection processor 112-1 may communicate with each other using a standardized on-board peripheral interface such as a universal asynchronous receiver/transmitter (UART) or a serial peripheral interface (SPI) bus.

The unique node identification information may be preferably preliminarily allocated unique node identification identification (ID), but may not be limited thereto in the present invention. For example, it may be at least one of the name, password, serial number, type, manufacturer, media access control (MAC) address, unique Internet protocol (IP) address, model, and version of the first wireless node 100-1 or the first hub device 110-1, or may be authentication information generated by a secret key of the first wireless node 100-1 or the first hub device 110-1 or a PKI-based private key.

The second wireless node 100-2 configures a wireless network through a wireless connection with the first wireless nodes 100-1. The second wireless node 100-2 includes a second hub device 110-2 having unique node identification information for data processing between the first wireless nodes 100-1 and one or more wireless communication devices 120-1 to 120-N connected to each other over a short-range wireless communication network.

The second hub device 110-2 of the second wireless node 100-2 preferably includes a second node processor 111-2 and a device connection processor 112-2. The node processor 111-2 has unique node identification information and is wirelessly connected to the first node processor 111-1 of the first wireless node 100-1 to perform data processing in conjunction with the first node processor 111-1. The device connection processor 112-2 is connected to the second node processor 111-2 via wire or wireless communication, and performs processing for wireless connection between the wireless communication devices 120-1 to 120-N in a short-range wireless communication manner.

Here, each of the wireless communication devices 120-1 to 120-N connected to the second hub device 110-2 of the second wireless node 100-2 may be configured with an Internet of Things (IoT) sensor.

The IoT sensor may be configured with at least one of a stereoscopic image sensor, an infrared thermal image sensor, a temperature sensor, a humidity sensor, a dust sensor, a smoke sensor, an illuminance sensor, a carbon monoxide sensor, a carbon dioxide sensor, an ozone sensor, a supersonic sensor, a motion sensor, an illumination sensor, a home appliance, a door lock, and an illuminance sensor.

The second node processor 111-2 and the device connection processor 112-2 may communicate with each other via a standard on-board peripheral interface such as a universal asynchronous receiver/transmitter (UART) or a serial peripheral interface (SPI) bus.

On the other hand, a wireless network configured by the wireless connection between the second wireless node 100-2 and the first wireless node 100-1 is preferably a wireless mesh network (WMN), but it is not limited thereto. It may be configured in various types of wireless network structures.

On the other hand, the short-range wireless communication may be, for example, at least any one of Bluetooth (preferably Bluetooth Low Energy (BLE), ZigBee, Beacon, Radio Frequency Identification (RFID), Ultra Wideband (UWB), and infrared radiation (IR) communication.

The management server 200 is connected to the first hub device 110-1 of the first wireless node 100-1 through the communication network 10 and transmits a device control command together with a lighting control command.

The management server 200 receives information of each of the wireless communication devices 120-1 to 120-N connected to the second hub device 110-2 of the second wireless node 100-2 via the first hub device 110-1 of the first wireless node 100-1, constructs a database with the received information for each of the wireless communication devices 120-1 to 120-N, and stores and manages the databases of the information of the wireless communication devices 120-1 to 120-N.

The communication protocol between the management server 200 and the first hub device 110-1 of the first wireless node 100-1 may be implemented by a wireless Internet protocol (IP) connection via at least one wireless access point (AP) or gateway.

Hereinafter, an example of the data processing procedure for obtaining the information of each of the wireless communication devices 120-1 to 120-N connected to the second hub device 110-2 of the second wireless node 100-2 through the management server 200 will be described below in detail.

In the management server 200, an information collection command for acquiring information of each of the wireless communication devices 120-1 to 120-N connected to the second hub device 110-2 of the second wireless node 100-2 is first generated, and then the generated information collection command for acquiring the information of each of the wireless communication devices 120-1 to 120-N is transmitted to the first hub device 110-1 of the first wireless node 100-1 through the communication network 10 by using the unique node identification information of the first hub device 110-1 of the first wireless node 100-1.

Thereafter, the first hub device 110-1 of the first wireless node 100-1 receives the information collection command for each of the wireless communication devices 120-1 through 120-N transmitted from the management server 200, encapsulates and converts the information collection command for each wireless communication device in accordance with a predefined heterogeneous wireless nodes communications protocol, and then transmits the resulting information collection command for each of the wireless communication devices 120-1 to 120-N to the second hub device 110-2 of the second wireless node 100-2 by using the unique node identification information corresponding to the second hub device 110-2 of the second wireless node 100-2.

Then, the second hub device 110-2 of the second wireless node 100-2 receives the information collection command having undergone the protocol conversion and then having been wirelessly transmitted from the first hub device 110-1 of the first wireless node 100-1, converts the received information collection command into a predefined short-range wireless communication protocol format, and transmits the information collection command for each of the wireless communication devices 120-1 to 120-N, which results from the short-range wireless communication protocol conversion, to a corresponding one of the wireless communication devices 120-1 through 120-N.

Next, in each of the wireless communication devices 120-1 to 120-N connected to the second hub device 110-2 of the second wireless node 100-2, the information collection command for a corresponding one of the wireless communication devices 120-1 to 120-N transmitted from the second hub device 110-2 of the second wireless node 100-2 is received. Afterwards, the information data of each of the wireless communication devices 120-1 to 120-N corresponding to the information collection commands is collected. Then, the collected information data of each of the wireless communication devices 120-1 to 120-N undergoes protocol conversion into a predefined short-range wireless communication protocol format. The collected information data resulting from the protocol conversion is transmitted to the second hub device 110-2 of the second wireless node 100-2.

Next, the second hub device 110-2 of the second wireless node 100-2 receives the information data of each of the wireless communication devices 120-1 through 120-N collected by and transmitted from each of the wireless communication devices 120-1 through 120-N, converts the information data into a predefined heterogeneous wireless node communication protocol format, and then wirelessly transmits the information data resulting from the protocol conversion to the first hub device 110-1 of the first wireless node 100-1 using the unique node identification information.

Then, the first hub device 110-1 of the first wireless node 100-1 receives the information data of each of the wireless communication device 120-1 through 120-N wirelessly transmitted from the second hub device 110-2 of the second wireless node 100-2, converts the received information data into a predefined communication protocol format, and transmits the information data which results from the protocol conversion to the management server 200 through the communication network 10.

Hereinafter, an example of the data processing procedure for controlling each of the wireless communication devices 120-1 to 120-N connected to the second hub device 110-2 of the second wireless node 100-2 via the above-described management server 200 will be described in detail. First, in the management server 200, control commands for controlling the respective wireless communication devices 120-1 to 120-N connected to the second hub device 110-2 of the second wireless node 100-2 are generated. After that, the generated control commands for controlling the communication devices 120-1 to 120-N are transmitted to the first hub device 110-1 of the first wireless node 100-1 through the communication network 10 by using the unique node identification information corresponding to the first hub device 110-1 of the first wireless node 100-1.

Thereafter, the first hub device 110-1 of the first wireless node 100-1 receives the control commands for controlling the respective wireless communication devices 120-1 through 120-N, which are transmitted from the management server 200, converts them into a predefined heterogeneous wireless node communication protocol format, and transmits the resulting control commands that are in the heterogeneous wireless node communication protocol format to the second hub device 110-2 of the second wireless node 100-2 by using the unique node identification information corresponding to the second hub device 110-2 of the second wireless node 100-2.

Next, the second hub device 110-2 of the second wireless node 100-2 receives the control commands that are in the heterogeneous wireless node communication protocol format and are transmitted from the first hub device 110-1 of the first wireless node 100-1, converts the received control commands into a predefined short-range wireless communication protocol format, and transmits the control commands resulting from the protocol conversion into the predefined short-range wireless communication protocol format to the respective wireless communication devices 120-1 through 120-N.

Next, in each of the wireless communication devices 120-1 to 120-N connected to the second hub device 110-2 of the second wireless node 100-2, the control command transmitted from the second hub device 110-2 of the second wireless node 100-2 is received. Each of the wireless communication devices 120-1 to 120-N performs the control based on the received control command, generates a control completion message after successfully performing the control, converts the generated control completion message into a predefined short-range wireless communication protocol format, and transmits the resulting control completion message to the second wireless node 100-2 to the hub device 110-2.

Subsequently, the second hub device 110-2 of the second wireless node 100-2 receives the control completion messages of the respective wireless communication devices 120-1 through 120-N generated by and transmitted from the respective wireless communication devices 120-1 to 120-N, converts the received control completion messages into a predefined heterogeneous wireless node communication protocol format, and wirelessly transmits the resulting control completion messages to the first node 110-1 of the first wireless node 100-1, by using the unique node identification information of the first hub device 110-1 of the first wireless node 100-1.

Then, the first hub device 110-1 of the first wireless node 100-1 receives the control completion message of each of the wireless communication devices 120-1 to 120-N wirelessly transmitted from the second hub device 110-2 of the second wireless node 100-2, converts it into a predefined communication protocol format, and transmits the resulting control completion message to the management server 200 through the communication network 10.

Each of the wireless electric/electronic devices 300-1 to 300-N receives a device control signal wirelessly transmitted from the first wireless node 100-1 and performs a function of driving and controlling the corresponding device based on the received device control signal.

Each of the wireless electric/electronic devices 300-1 to 300-N may be at least one home appliance with a wireless communication ability, selected from among a television (TV), a computer, a sound device, a video device, an intercom, an air conditioner, an air purifier, a fan, a refrigerator, a washing machine, a rice cooker, a fan heater, a boiler, and a vacuum cleaner. However, the type of wireless electric/electronic device may not be limited thereto. It may be any home appliance with a wireless communication ability.

Although, in one embodiment of the present invention, each of the wireless lighting device 20-1 to 20-N and each of the wireless electric/electronic devices 300-1 to 300-N of the first wireless node 100-1 are connected to communicate in an infrared radiation (IR) communication manner, the present invention is not limited thereto. That is, each wireless lighting device and each wireless electric/electronic device may be connected to communicate with each other through a short-range wireless communication manner, for example, Beacon, Zigbee, Bluetooth, ultra wideband (UWB), or a radio frequency, or radio frequency identification (RFID). In this case, each of the wireless lighting devices 20-1 to 20-N preferably includes a module for converting the device control command transmitted from the management server 200 in accordance with to the applied short-range wireless communication protocol.

Hereinafter, an example of the data processing procedure for a case will be described where a third wireless node 100-3 is added to a wireless network in which the first wireless node 100-1 and the second wireless node 100-2 are wirelessly connected to each other, wherein the third wireless node 100-3 is a different type of node from the first and second wireless nodes 100-1 and 100-2.

First, the third wireless node 100-3 configures a wireless network by wirelessly connecting with heterogeneous wireless nodes such as the first node 100-1 and/or the second wireless node 100-2. The third wireless node 100-3 includes a third hub device 110-3 having unique node identification information for processing data for data exchange with the wireless node 100-1 and/or the wireless node 100-2 and includes one or more wireless communication devices 120'-1 to 120'-N in a short-range wireless communication manner.

The third hub device 110-3 of the third wireless node 100-3 includes a third node processor 111-3 that is wirelessly connected to the first node processor 111-1 of the first wireless node 100-1 and/or the second node processor 111-2 of the second wireless node 100-2, has unique node identification information required for data exchange, and performs data processing. The third hub device 110-3 of the third wireless node 100-3 further includes a device connection processor 112-3 that is connected to the third node processor 111-3 in a wired or wireless communication manner, and which performs wireless communication with each of the wireless communication devices 120'-1 to 120'-N in a short-range wireless communication manner.

As described above, when there is a network environment where the first wireless node 100-1 and the second wireless node 100-2 are wirelessly connected to each other, an example of the data processing procedure for controlling each of the wireless communication devices 120'-1 to 120'-N connected to the third hub device 110-3 of the third wireless node 100-3 will be described for a case where the third wireless node 100-3 that is a different type of node from the first wireless node 100-1 and the second wireless node 100-2 is added to the existing network environment in which the first wireless node 100-1 and the second wireless node 100-2 are wirelessly connected to each other.

First, in the management server 200, control commands for controlling the respective wireless communication devices 120'-1 to 120'-N connected to the third hub device 110-3 of the third wireless node 100-3 are generated. After that, the control commands for controlling the respective wireless communication devices 120'-1 to 120'-N are connected to the first hub device 110-1 of the first wireless node 100-1 through the communication network 10 by using the unique node identification information corresponding to the first hub device 110-1 of the first wireless node 100-1.

Thereafter, the first hub device 110-1 of the first wireless node 100-1 receives a control command for controlling each of the wireless communication devices 120'-1 to 120'-N transmitted from the management server 200, converts each of the control commands into a predefined heterogeneous wireless node communication protocol format, and transmits the corresponding control command having undergone the protocol conversion to the third hub device 110-3 of the third wireless node 100-3 by using the unique node identification information corresponding to the third hub device 110-3 of the third wireless node 100-3.

The third hub device 110-3 of the third wireless node 100-3 receives the control commands for controlling the respective wireless communication devices 120'-1 to 120'-N wirelessly transmitted from the first hub device 110-1 of the first wireless node 100-1, converts the received control commands in accordance with a short-range wireless communication protocol, and transmits the resulting control commands to the respective wireless communication devices 120'-1 to 120'-N.

Next, each of the wireless communication devices 120'-1 to 120'-N connected to the third hub device 110-3 of the third wireless node 100-3 receives a corresponding one of the control commands transmitted from the third hub device 110-3 of the third wireless node 100-3, performs the control thereon based on the received control command, generates a control completion message for the corresponding one of the wireless communication devices 120'-1 to 120'-N, converts the control completion message into a predefined short-range wireless communication protocol format, and transmits the resulting control completion message to the third hub device 110-3 of the third wireless node 100-3. Thereafter, the third hub device 110-3 of the third wireless node 100-3 receives the control completion message for each of the wireless communication devices 120'-1 to 120'-N, generated by and transmitted from the corresponding one of the wireless communication devices 120'-1 to 120'-N, converts it into a predefined heterogeneous wireless node communication protocol format, and wirelessly transmits the control completion messages resulting from the protocol conversion, for the respective wireless communication devices 120'-1 to 120'-N, to the first hub device 110-1 of the first wireless node 100-1 by using the corresponding node identification information. The first hub device 110-1 of the first wireless node 100-1 then receives the control completion messages of the respective wireless communication devices 120'-1 to 120'-N, which are wirelessly transmitted from the third hub device 110-3 of the third wireless node 100-3, converts the receives control completion messages in accordance with a predefined communication protocol, and the resulting control completion messages to the management server 200 through the communication network 10.

Hereinafter, in a case where the wireless network in which the first wireless node 100-1 and the second wireless node 100-2 are wirelessly connected to each other is expanded to further include the third wireless node 100-3 of a different type from the first and second wireless nodes, an example of the data processing procedure for obtaining information of each of the wireless communication devices 120'-1 to 120'-N connected to the third hub device 110-3 of the third wireless node 100-3 through the management server 200 will be described in detail below.

First, the management server 200 generates an information collection command for acquiring the information of each of the wireless communication devices 120'-1 to 120'-N connected to the third hub device 110-3 of the third wireless node 100-3, and transmits the generated information collection commands corresponding to the respective wireless communication devices 120'-1 to 120'-N to the first hub device 110-1 of the first wireless node 100-1 through the communication network 10 by using the unique node identification information corresponding to the first hub device 110-1 of the first wireless node 100-1.

Thereafter, the first hub device 110-1 of the first wireless node 100-1 receives the information collection command for each of the wireless communication devices 120'-1 to 120'-N transmitted from the management server 200, converts it into a predefined heterogeneous wireless node communication protocol format, and transmits, to the third hub device 110-3 of the third wireless node 100-3, the information collection command for each of the wireless communication devices 120'-1 to 120'-N, resulting from the protocol conversion, by using the unique node identification information corresponding to the third hub device 110-3 of the third wireless node 100-3.

The third hub device 110-3 of the third wireless node 100-3 receives the information collection command for each of the wireless communication devices 120'-1 to 120'-N, which has undergone the primary protocol conversion into the heterogeneous wireless node communication protocol format and has been wirelessly transmitted from the first hub device 110-1 of the first wireless node 100-1, converts each received information collection command into a predefined short-range wireless communication protocol format, and transmits the information collection commands resulting from the secondary protocol conversion to the respective wireless communication devices 120'-1 to 120'-N.

Next, each of the wireless communication devices 120'-1 to 120'-N connected to the third hub device 110-3 of the third wireless node 100-3 receives a corresponding one of the information collection commands transmitted from the third hub device 110-3 of the third wireless node 100-3, collects the information data of itself based on the received information collection command, converts the collected information data thereof into a predefined short-range wireless communication protocol format, and transmits the resulting collected information data to the third hub device 110-3 of the third wireless node 100-3.

Thereafter, the third hub device 110-3 of the third wireless node 100-3 receives the information data of each of the wireless communication devices 120'-1 through 120'-N collected by and transmitted from the wireless communication devices, converts the information data into a predefined heterogeneous wireless node communication protocol format, and wirelessly transmits the resulting information data of each of the wireless communication devices 120'-1 to 120'-N to the first hub device 110-1 of the first wireless node 100-1 by using the unique node identification information of the first hub device 110-1 of the first wireless node 100-1.

The first hub device 110-1 of the first wireless node 100-1 then receives the information data of each of the wireless communication devices 120'-1 to 120'-N wirelessly transmitted from the third hub device 110-3 of the third wireless node 100-3, converts it into a predefined communication protocol format, and transmits the resulting information data to the management server 200 through the communication network 10.

In this way, when a new wireless node of a different type (based on a different communication protocol) is newly added to an existing network, it is possible to expand a wireless network while maintaining the existing wireless network environment by using unique node identification information newly allocated to the hub device of the added wireless node. Therefore, it is possible to easily expand an existing wireless network to include heterogeneous wireless nodes therein while maintaining an existing hub system, without less spatial constraints.

A wireless terminal 400 may be connected to the management server 200 via any one of a short-range wireless communication method (for example, Beacon, ZigBee, Bluetooth, ultra wideband (UWB), or radio frequency identification (RFID), or infrared radiation (IR) communication, or via the communication network 10.

The wireless terminal 400 may provide a combined lighting and device control management service by downloading a lighting and device control application program capable of providing a lighting and device control management function through an application store or the management server 200.

In addition, by using the combined lighting and device control application installed in the wireless terminal 400, it is possible to wirelessly transmit a lighting control command together with a device control command to the management server 200 in order to control at least one lighting module (for example, the LED lighting module 21) included in each of the wireless lighting devices 20-1 to 20-N of the first wireless node 100-1 and to control each of the wireless electric/electronic devices 300-1 to 300-N.

In addition, when transmission of the lighting control command is performed using the lighting and device control application installed in the wireless terminal 400, unique device identification information of the wireless lighting devices 20-1 to 20-N may be transmitted along with the lighting control command.

The unique device identification information of each of the wireless lighting devices 20-1 to 20-N may include, for example, at least one of the name, password, serial number, type, manufacturer, media access control (MAC) address, unique Internet protocol (IP) address, model and version of a corresponding one of the wireless lighting devices 20-1 to 20-N, or it may be authentication information generated by using a secret key of the wireless lighting device or by using a PKI-based private key. However, the unique device identification information may not be limited thereto, but it may be any information that can be used to identify a wireless lighting device.

In addition, when the device control command is transmitted using the lighting and device control application of the wireless terminal 400, the unique device identification information of the wireless electric/electronic devices 300-1 to 300-N also can be transmitted together.

The unique device identification information of each of the wireless electric/electronic devices 300-1 to 300-N may include, for example, at least one of the name, password, serial number, type, manufacturer, media access control (MAC) address, unique Internet protocol (IP) address, model, and version of a corresponding one of the electric/electronic devices 300-1 to 300-N, or it may be authentication information generated by using a secret key of the wireless electric/electronic device or by using a PKI-based private key. However, the unique device identification information may not be limited thereto, but may be any information that can be used to identify a wireless electric/electronic device.

In addition, when the device control command is transmitted along with the lighting control command using the lighting and device control application of the wireless terminal 400, the unique device identification information of the corresponding wireless terminal 400 may be transmitted together.

The unique device identification information of the wireless terminal 400 may include, for example, at least one of the name, password, serial number, type, manufacturer, media access control (MAC) address, unique Internet protocol (IP) address, model and version of the wireless terminal 400, or it may be authentication information generated by using a secret key of the wireless terminal 400 or by using a PKI-based private key. However, the unique device identification information may not be limited thereto, but it may be any information that can be used to identify a wireless terminal.

In addition, by using the lighting and device control application installed in the wireless terminal 400, a request message for setting the terminal identification information also may be transmitted together with device identification information unique to each of the wireless lighting devices 20-1 to 20-N.

In addition, an information setting service may be performed by using the lighting and device control application installed in the wireless terminal 400 in a manner that the wireless terminal 400 receives a synchronization signal transmitted from the management server 200 using the lighting and device control application, performs synchronization with the management server 200, and sets and stores the unique terminal identification information.

Meanwhile, the management server 200 compares the unique terminal identification information of the wireless terminal 400, transmitted through the lighting and device control application of the wireless terminal 400, with the predefined terminal identification information. When the compared information matches, the control of transmitting the device control command together with the lighting control command may be transmitted to the first wireless node 100-1.

In addition, the terminal identification information preset in the management server 200 may be preset by using the lighting and device control application of the wireless terminal 400 and may be stored in a separate database (DB) (not illustrated).

The management server 200 may receive a request message for setting of the terminal identification information along with the unique device identification information of the corresponding wireless lighting device of the wireless lighting devices 20-1 to 20-N of the first wireless node 100-1 transmitted from the wireless terminal 400 and compare it with the unique device identification information of the wireless lighting devices 20-1 to 20-N stored in the form of the database. When the compared information matches, the management server 200 may transmit a synchronization signal to the corresponding wireless terminal 400.

Meanwhile, in the embodiment of the present invention, although preferably the wireless terminal 400 performs data transmission and reception with the management server 200 using the lighting and device control application installed therein, the present invention is not limited to this. That is, instead of using the lighting and device control application, the wireless terminal 400 may perform the wireless data communication with the management server 200 via a built-in wireless communication module.

On the other hand, the wireless terminal 400 may be a mobile terminal selected from among a smart phone, a smart pad, and a smart note communicating through a wireless Internet or a mobile Internet. However, the wireless terminal 400 may not be limited thereto but may have a comprehensive meaning referring to any wired/wireless communication device having a user interface to connect to the management server 200. For example, it may be any one of a palm PC, a mobile play station, a digital multimedia broadcasting phone having a communication ability, a tablet PC, an iPad, and artificial intelligence (AI)-based wired/wireless communication devices (for example, AI speaker, AI remote controller, AI vacuum cleaner, AI rice cooker, AI TV, etc.).

When the wireless terminal 400 is at least one of a smart phone, a smart pad, and a smart note, as illustrated in FIG. 3, the wireless terminal 400 includes a wireless communication module 410, an audio/video (A/V) input module 420, a user input module 430, a sensing module 440, an output module 450, a storage module 460, an interface module 470, a terminal control module 480, a power supply module 490, and the like. On the other hand, the components illustrated in FIG. 3 are not essential. That is, the wireless terminal 400 may have more or fewer components.

Hereinafter, the components of the wireless terminal 400 may be described below in detail.

The wireless communication module 410 may include one or more modules that enable wireless communication between the wireless terminal 400 and the management server 200. For example, the wireless communication module 410 may include a broadcast receiving module 411, a mobile communication module 412, a wireless Internet module 413, a short-range communication module 414, and a position information module 415.

The broadcast receiving module 411 receives a broadcast signal (e.g., a TV broadcast signal, a radio broadcast signal, a data broadcast signal, etc.) from an external broadcast management server through various broadcast channels (e.g., a satellite channel and a terrestrial channel) and receives the related information.

The mobile communication module 412 transmits and receives radio signals to and from at least one of a base station, an external terminal, and a server over a mobile communication network. The wireless signals may include a voice call signal, a video call signal, or various types of data used in communication of a text/multimedia message.

The wireless Internet module 413 is a module for wireless Internet access, and may be built in the wireless terminal 400 or externally coupled to the wireless terminal. For example, WLAN (Wi-Fi), Wibro, Wimax, HSDPA, LTE and the like can be used as the wireless Internet access technology.

The short-range communication module 414 is a module for short-range communication. For example, Bluetooth communication, ZigBee communication, Ultra Wideband (UWB) communication, radio frequency identification (RFID) communication, or infrared radiation communication may be used as the short-range communication technology.

The position information module 415 is a module for checking or obtaining the position information of the wireless terminal 400 and can obtain current position information of the wireless terminal 400 using a global positioning system (GPS) or the like.

The A/V input module 420 is a module for inputting an audio signal or a video signal, and generally includes a camera unit 421 and a microphone unit 422. The camera unit 421 processes an image frame such as a still image or a moving image obtained by an image sensor in video communication mode or photographing mode. The microphone unit 422 receives an external sound signal through a microphone in communication mode, recording mode, voice recognition mode, or the like, and processes it into electrical voice data.

The user input module 430 may be a module that allows a user to generate data for controlling operation of a terminal. Examples of the user input module 430 may include a key pad dome switch, a touch pad (static resistive type/capacitive type), a jog wheel, a jog switch, and the like.

The sensing module 440 senses a current state of the wireless terminal 400, for example, the open/close state of the wireless terminal, the current position of the wireless terminal, whether or not the user touches the wireless terminal 400, the user's touch operation with respect to a specific part of the wireless terminal 400, the orientation of the wireless terminal 400, and the acceleration/deceleration of the wireless terminal 400, and generates a sensing signal for controlling the operation of the wireless terminal 400. The sensing signal is transmitted to the terminal control module 480 as a base signal on which the terminal control module 480 can perform a specific function.

The output module 450 is a module for generating an output signal related to a visual, audible, or tactile sense and includes a display portion 451, an audio output portion 452, an alarm portion 453, and a haptic portion 454.

The display unit 451 displays and outputs information processed by the wireless terminal 400. For example, when the wireless terminal 400 is in the call mode, a user interface (UI) or a graphic user interface (GUI) associated with the call is displayed on the display unit 451. In the video call mode or the photographing mode, a UI or GUI, or a photographed and/or received image will be displayed.

The audio output unit 452 may output audio data received from the wireless communication module 410 or stored in the storage module 460, for example, in the call signal reception mode, the call mode, the recording mode, the speech recognition mode, or the broadcast reception mode.

The alarm unit 453 may output a signal for notifying the occurrence of an event of the wireless terminal 400. Examples of events generated in the wireless terminal 400 include a call signal reception, a message reception, a key signal input, a touch input, and the like.

The haptic portion 454 generates various tactile effects that the user can feel. A typical example of the haptic effect generated by the haptic portion 454 is vibration. The intensity and pattern of the vibration generated by the haptic portion 454 can be controlled. [0192] The storage module 460 may retain a program for operation of the terminal control module 480 and temporarily retain input/output data (e.g., a phone book, a message, a still image, a moving picture, etc.). The storage module 460 may retain data related to vibration and sound of various patterns outputted when a touch input is given on the touch screen.

The storage module 460 may be any one of a flash memory type, a hard disk type, a multimedia card micro type, a card type memory (such as SD or XD memory), a RAM, an SRAM, a ROM, an EEPROM, a PROM, a magnetic memory, a magnetic disk, and an optical disk.

The interface module 470 serves as a pathway for communication with all external devices connected to the wireless terminal 400. The interface module 470 receives data from an external device or receives power from a power supply to transfer the data to each component in the wireless terminal 400 or transmits data in the wireless terminal 400 to an external device.

The terminal control module 480 typically controls the overall operation of the wireless terminal 400 and performs controls and processing for, for example, voice calls, data communications, video calls, and the like.

In addition, the terminal control module 480 controls the lighting and device control application programs stored in the storage module 460 to be executed. The terminal control module 480 performs the control of generating a lighting control command and a device control command for driving and controlling each of the wireless lighting devices 20-1 to 20-N and each of the electric/electronic devices 300-1 to 300-N on the first wireless node 100-1 by using the service provided the executed lighting and device control application, and of transmitting the lighting control command and the device control command to the management server 200 through the wireless communication module 410.

In addition, the terminal control module 480 may regularly monitor the charging current and the charging voltage of the battery unit 495, and temporarily store the monitoring value in the storage module 460. In this case, it is preferable that the storage module 460 retains not only battery charging status information such as the monitored charging current and charging voltage, but also battery specification information (product code, rating, etc.).

The power supply module 490 receives external power or internal power under the control of the terminal control module 480 and supplies power required for operation of the respective components. The power module 490 can supply the power of the built-in battery unit 495 to each of the components and can operate the built-in battery using a charging connection terminal (not illustrated).

The various embodiments described herein may be implemented by hardware, software, or a combination thereof, and implemented in a recording medium readable by a computer or similar device.

In the case of being implemented by hardware, the embodiments described herein may be implemented as at least one of an application specific integrated circuits (ASIC), a digital signal processor (DSP), a digital signal processing device (DSPD), a programmable logic device (PLD), a field programmable gate array (FPGA), a processor, a controller, a microcontroller, a microprocessor, and a function-executable electronic unit. In some cases, the embodiments will be implemented by the terminal control module 480.

In accordance with a software implementation, embodiments such as procedures or functions may be implemented with separate software modules that perform at least one function or operation. The software code may be implemented by a software application written in a suitable programming language. The software code may also be stored in the storage module 460 and executed by the terminal control module 480.

While the preferred embodiment of the system for integrated remote control of wireless lighting devices and wireless electric/electronic devices in a wireless network environment, according to the present invention, has been described, it is to be understood that the invention is not limited to the disclosed exemplary embodiment. It will be also understood by those skilled in the art that various changes in form and details may be made therein without departing from the spirit and scope of the invention as defined by the appended claims.

What is claimed is:

1. A system for integrated remote control of wireless lighting devices and wireless electric/electronic devices in a wireless network environment, the system comprising:
   a management server configured to simultaneously transmit a lighting control command and a device control command;
   a first wireless nodes connected to the management server through a communication network, each first node being configured to receive and analyze the lighting control command and the device control command transmitted from the management server, to generate a lighting control signal and a device control signal that are separate and independent signals for individually driving and controlling at least one wireless lighting device and at least one electric/electronic device, thereby individually driving and controlling each of the wireless lighting devices, and to wirelessly transmit the device control signal for each of the wireless electric/electronic devices;
   a second wireless node constructing a wireless network by wirelessly connecting to the first wireless node, performing data processing so as to communicate data with the first wireless nodes, and including a wireless communication devices connected to each other in a short-range wireless communication manner; and
   the wireless electric/electronic device configured to wirelessly receive the device control signal wirelessly transmitted from the first wireless node so as to be driven and controlled based on the received device control signal,
   wherein the first wireless node comprises a first hub device having unique node identification information and performing data processing to enable data communication between heterogeneous wireless nodes;
   the second wireless node comprises a second hub device having unique node identification information and performing data processing to enable data communication with the first wireless nodes, and one or more wireless communication devices connected to each other in a short-range communication manner; and
   the management server is connected to the first hub device of the first wireless node through the communication network and is configured to receive information of each of the wireless communication devices connected to the second hub device of the second wireless node via the first hub device of the first wireless node and to store and manage the received information in a database form for each of the wireless communication devices.

2. The system according to claim 1, wherein the management server generates an information collection command for acquiring information of each of the wireless communication devices connected to the second wireless node, and transmits the generated information collection command for the each of the wireless communication devices to the first hub device of the first wireless node through the communication network by using the unique node identification information of the first hub device;
   the first hub device of the first wireless node receives the information collection command transmitted from the management server for each of the wireless communication devices, converts the information collection into a predefined heterogeneous wireless node communication protocol format, and wirelessly transmits the resulting information collection command in the heterogeneous wireless node communication protocol format, to the second hub device of the second wireless node by using the unique node identification information of the second hub device; and
   the second hub device of the second wireless node receives the transmitted information collection command in the heterogeneous wireless node communication protocol format, from the first hub device of the first wireless node, converts the received the information collection command into a predefined short-range wireless communication protocol format, and transmits the resulting information collection command in the short-range wireless communication protocol format, for each of the wireless communication devices, to a corresponding one of the wireless communication devices.

3. The system according to claim 2, wherein each of the wireless communication devices connected to the second hub device of the second wireless node performs receiving the information collection command transmitted from the second hub device of the second wireless node, collecting information data thereof, based on the information collection command, converting the collected information data thereof into a predefined short-range wireless communication protocol format, and transmitting the information data in the short-range wireless communication protocol format to the second hub device of the second wireless node;

wherein the second hub device of the second wireless node performs receiving information data of each of the wireless communication devices collected by and transmitted from each of the wireless communication devices, converting the information data into a predefined heterogeneous wireless node communication protocol format, and wirelessly transmitting the information data of each of the wireless communication devices in the heterogeneous wireless node communication protocol format to the first hub device of the first wireless node by using the unique node identification information of the first hub device; and wherein the first hub device of the first wireless node receives the information data of each of the wireless communication devices, which is wirelessly transmitted from the second hub device of the second wireless node, converts the received information data into a predefined communication protocol format, and transmits the resulting information data in the predefined communication protocol format to the management server through the communication network.

4. The system according to claim 1, wherein the management server generates a control command for controlling each of the wireless communication devices connected the second wireless node, and transmits the control command for each of the wireless communication devices to the first hub device of the first wireless node through the communication network by using the unique node identification information of the first hub device;

wherein the first hub device of the first wireless node receives the control command for controlling each of the wireless communication devices, which is transmitted from the management server, converts the control command into a predefined heterogeneous wireless node communication protocol format, wirelessly transmits the resulting control command for controlling each of the wireless communication devices, which is in the heterogeneous wireless node communication protocol format, to the second hub device of the second wireless node by using the unique node identification of the second hub device; and wherein the second hub device of the second wireless node receives the control command for each of the wireless communication devices, which is in the heterogeneous wireless node communication protocol format and is wirelessly transmitted, from the first hub device of the first wireless node, converts the control command into a predefined short-range wireless communication protocol format, transmits the resulting control command for each of the wireless communication devices, which is in the short-range wireless communication protocol format, to a corresponding one of the wireless communication devices.

5. The system according to claim 4, wherein each of the wireless communication devices connected to the second hub device of the second wireless node receives the control command for a corresponding one of the wireless communication devices transmitted from the second hub device of the second wireless node, performs control on the corresponding one of the wireless communication devices, based on the received control command, generates a control completion message thereof, converts the control completion message into a predefined short-range wireless communication protocol format, and transmits the resulting control completion message in the predefined short-range wireless communication protocol format to the second hub device of the second wireless node;

wherein the second hub device of the second wireless node receives the control completion message generated by and transmitted from each of the wireless communication devices, converts the control completion message into a predefined heterogeneous wireless node communication protocol format, and wirelessly transmits the control completion message for each of the wireless communication devices in the heterogeneous wireless node communication protocol format to the first hub device of the first wireless node by using the unique node identification information of the first hub device; and wherein the first hub device of the first wireless node receives the control completion message of each of the wireless communication devices, which is wirelessly transmitted from the second hub device of the second wireless node, converts the control completion message into a predefined communication protocol format, and transmits the resulting control completion message in the communication protocol format to the management server through the communication network.

6. The system according to claim 1, further comprising one or more third wireless nodes, each third wireless node comprising a third hub device having unique identification information and performing data processing to enable data exchange between heterogeneous wireless nodes and one or more wireless communication devices connected to each other in a short-range wireless communication manner, wherein the management server generates control commands for controlling the respective wireless communication devices connected to the third wireless node, transmits the control commands for controlling the respective wireless communication devices connected to the third wireless node, to the first hub device of the first wireless node by using the unique node identification information of the first hub device, wherein the first hub device of the first wireless node receives the control commands for controlling the respective wireless communication devices transmitted from the management server, converts the control commands into a predefined heterogeneous wireless node communication protocol format, and wirelessly transmits the resulting control commands for the respective wireless communication devices to the third hub device of the third wireless node by using the unique node identification information of the third hub device, and wherein the third hub device of the third wireless nodes receives the control commands for the respective wireless communication devices, which are in the heterogeneous wireless node communication protocol format and are transmitted from the first hub device of the first wireless node, converts the resulting control commands into a predefined short-range wireless communication protocol format, and transmits the control commands in the short-range wireless communication protocol format, to the corresponding wireless communication devices.

7. The system according to claim 6, wherein each of the wireless communication devices connected to the third hub device of the third wireless nodes receives the control command for a corresponding one of the wireless communication devices from the third hub device of the third wireless node, performs control based on the received control command, generates a control completion message thereof based on the received control command, converts the control completion message into a predefined short-range wireless communication protocol format, and transmits the resulting control completion message in the short-range wireless communication protocol format to the third hub device of the third wireless nodes, wherein the third hub device of the third wireless nodes receives the control completion message generated by and transmitted from each of the wireless communication devices, converts the control completion message for each of the wireless communication devices into a predefined heterogeneous wireless node communication protocol format, and wirelessly transmits the resulting control completion message in the heterogeneous wireless node communication protocol format of each of the wireless communication devices to the first hub device of the first wireless node by using the unique node identification information of the first hub device, wherein the first hub device of the first wireless node receives the control completion message of each of the wireless communication devices, wirelessly transmitted from the third hub device of the third wireless node, converts the control completion message into a predefined communication protocol format, and transmits the control completion message to the management server through the communication network.

8. The system according to claim 6, wherein the management server generates an information collection command for acquiring information of each of the wireless communication devices connected to the third wireless node, and transmits the generated information collection command for each of the wireless communication devices to the first hub device of the first wireless node through the communication network by using the unique identification information of the first hub device, wherein the first hub device of the first wireless node receives the information collection command for each of the wireless communication devices transmitted from the management server, converts the received information collection commands into a predefined heterogeneous wireless node communication protocol format, and wirelessly transmits the resulting information collection commands in the heterogeneous wireless node communication protocol format for the wireless communication devices, to the third hub device of the third wireless nodes by using the unique node identification information of the third hub device, wherein the third hub device of the third wireless nodes receives the information collection command in the heterogeneous wireless node communication protocol format for each of the wireless communication devices, converts the received information collection commands into a predefined short-range wireless communication protocol format, and transmits the resulting information collection commands in the short-range wireless communication protocol format for each of the wireless communication devices, to a corresponding one of the wireless communication devices.

9. The system according to claim 8, wherein each of the wireless communication devices connected to the third hub device of the third wireless, receives information collection command for a corresponding one of the wireless communication devices from the third hub device of the third wireless node, collects information data thereof when the wireless communication device itself corresponds to the received information collection command, based on the received information collection commands for each of the wireless communication devices, converts the collected information data of each of the wireless communication devices into a predefined short-range wireless communication protocol format, and transmits the collected information in the short-range wireless communication protocol format to the third hub device of the third wireless nodes, wherein the third hub device of the third wireless nodes receives the information data of each of the wireless communication devices collected by and transmitted from each of the wireless communication devices, converts the received information data into a heterogeneous wireless node communication protocol format, and wirelessly transmits the information data, having the heterogeneous wireless node communication protocol format, of each of the wireless communication devices, to the first hub device of the first wireless node by using the unique identification information of the first hub device, and wherein the first hub device of the first wireless node receives the information data of each of the wireless communication devices wirelessly transmitted from the third hub device of the third wireless node, converts the information data into a predefined communication protocol, and transmits the information data resulting from the conversion, to the management server through the communication network.

10. The system according to claim 1, wherein the first hub device of the first wireless node includes a first node processor having unique node identification information and performing data processing to enable data communication between heterogeneous wireless nodes, and wherein the second hub device of the second wireless node includes a second node processor wirelessly connected to the first node processor of the first wireless node for data communication and having unique node identification information, and a device connection processor connected to the second node processor in a wired or wireless manner and performing wireless connection between the wireless communication devices in a short-range wireless communication manner.

11. The system according to claim 10, wherein the second node processor and the device connection processor communicate with each other using a standard on-board peripheral interface.

12. The system according to claim 1, wherein a communication protocol for communication between the first hub device of the first wireless node and the management server is implemented by a wireless Internet protocol (IP) via at least one wireless access point (AP) or a gateway.

13. The system according to claim 1, wherein the communication network is a wireless communication network selected from the group consisting of WiFi for provision of high-speed multimedia transmission service, WiGig, wireless broadband internet (Wibro), and world interoperability for microwave access (Wimax), or is a cellular-based wideband code division multiple access (WCDMA), or is a mobile communication network selected among a 3G network, an LTE network, a 4G network, and a 5G network.

14. The system according to claim 1, wherein the short-range wireless communication is performed by a short-range wireless communication selected from the group consisting of Bluetooth, ZigBee, Beacon, radio frequency identification (RFID), ultra wideband (UWB), and infrared radiation communication.

15. The system according to claim 1, wherein the wireless network is configured with a wireless mesh network (WMN).

16. The system according to claim 1, wherein the unique node identification information comprises unique node identification that is preliminarily allocated.

17. The system according to claim 1, wherein each of the wireless communication devices connected to the second hub device of the second wireless node comprises an Internet of Things (IoT) sensor.

18. The system according to claim 17, wherein the IoT sensor comprises a sensor selected from the group consisting of a stereoscopic image sensor, an infrared thermal image sensor, a temperature sensor, a humidity sensor, a dust sensor, a smoke sensor, a illuminance sensor, a carbon monoxide sensor, a carbon dioxide sensor, an ozone sensor, a ultrasonic sensor, a motion sensor, a lighting sensor, a household appliance, a door lock, and a illuminance sensor.

19. The system according to claim 1, wherein each of the wireless lighting devices of the first wireless node comprises:
  an LED lighting module for emitting light to the outside using at least one light emitting diode (LED) lighting device;
  an IR generating module for emitting an infrared radiation (IR) signal to the outside using at least one infrared radiation (IR) emitting device;
  an LED driving module for driving each of the light emitting diode (LED) lighting devices of the LED lighting module;
  an IR driving module for driving each of the infrared radiation (IR) emitting devices of the IR generating module;
  a communication module for wirelessly receiving the device control command and the lighting control command transmitted from the management server; and
  a control module for receiving and analyzing the lighting control command and the device control command wirelessly transmitted from the communication module and separately generating and outputting the lighting control signal and the device control signal for independently and individually driving and controlling each of the wireless lighting devices and each of the wireless electric/electronic devices, based on the received lighting control command and the device control command.

20. The system according to claim 19, wherein the LED driving module comprises:
  a pulse width modulation (PWM) generator for generating a pulse width modulation (PWM) signal corresponding to the lighting control command transmitted from the management server under the control of the control module; and
  an LED driver for applying a direct current (DC) or alternating current (AC) driving power so that a corresponding LED lighting devices is turned on and off and a brightness of the corresponding LED lighting devices is adjusted according to the pulse width modulation (PWM) signal generated by the PWM generator.

21. The system according to claim 19, wherein the IR driving module comprises:
  an IR modulator for modulating the device control command transmitted from the management server into an IR modulated signal according to the control of the control module; and
  an IR driver for applying a driving power according to the IR modulated signal output from the IR modulator such that a corresponding one of the IR light emitting devices is turned on and off according to the IR modulated signal.

22. The system according to claim 21, wherein the IR modulator converts the device control command into the IR modulated signal having an infrared radiation (IR) code of a specific pattern in accordance with an existing communication channel standard.

23. The system according to claim 1, wherein when transmitting the lighting control command through the management server, the management server transmits unique identification information of a corresponding one of the wireless lighting devices together with the lighting control command, wherein the unique identification information of the wireless lighting device selected from the group consisting of a name, password, serial number, type, manufacturer, media access control (MAC) address, unique Internet protocol (IP) address, model, and version of the wireless lighting device, and authentication information of the wireless lighting device generated by using a secrete key of the wireless lighting device or a PKI-based private key.

24. The system according to claim 1, wherein when the device control command is transmitted through the management server, unique device identification information of a corresponding wireless electric/electronic devices is transmitted along with the device control command, wherein the unique device identification information is selected from the group consisting of a name, password, serial number, type, manufacturer, MAC address, IP address, model, and version of the wireless electric/electronic device, and authentication information of the wireless electric/electronic device generated by using a private key of the wireless electric/electronic device or a PKI-based private key.

25. The system according to claim 1, further comprising:
  a wireless terminal configured to wirelessly transmit the lighting control command and the device control command to the management server,
  wherein the wireless terminal is selected from the group consisting of a smart phone, a smart pad, a smart note, an artificial intelligence (AI)-based wireless communication device.

26. The system according to claim 25, wherein when the wireless terminal is a mobile communication terminal selected from the group consisting of the smart phone, the smart pad, and the smart note, the lighting control command and the device control command are wirelessly transmitted by a lighting and device control application pre-installed in the mobile communication terminal.

27. The system according to claim 25, wherein when the lighting control command and the device control command are transmitted through the wireless terminal, unique terminal identification information of the wireless terminal is transmitted along with the lighting control command and the device control command,
  wherein the management server compares the unique terminal identification information transmitted through the wireless terminal and unique terminal identification information that is preset, when both pieces of the unique terminal identification information match, the management server transmits the lighting control command and the device control command to the first wireless node, wherein the unique terminal identification information of the wireless terminal is selected from the group consisting of a name, password, serial number, type, manufacturer, media access control (MAC) address, unique Internet protocol (IP) address, model, and version of the wireless terminal, and authentication information of the wireless terminal generated by using a private key of the wireless terminal or a PKI-based private key.

28. The system according to claim 26, wherein the terminal identification information preset in the management server is preliminarily set by the wireless terminal and stored in a separate database, the wireless terminal transmits a request message for requesting setting of the terminal identification information along with the unique device identification information of the corresponding wireless lighting device, the management server receives the unique device identification information of one of the wireless lighting devices transmitted from the wireless terminal and the request message for requesting setting of the terminal identification information, compares the unique device identification information of the wireless lighting device stored therein with the received unique device identification information, and transmits a synchronization signal to the wireless terminal when the received information and the stored information match, and the wireless terminal receives the synchronization signal transmitted from the management server and synchronizes itself with the management server, and performs a information setting function by which the unique device identification of the wireless terminal is set and stored.

29. The system according to claim 1, wherein the wireless electric/electronic device is a home appliance selected having a wireless communication ability, the home appliance being selected from the group consisting of a TV, a computer, sound equipment, video equipment, an intercom, an air conditioner, an air purifier, an electric fan, a refrigerator, a washing machine, a rice cooker, a fan heater, a boiler, a microwave oven, and a vacuum cleaner.

* * * * *